United States Patent [19]
Suzuki et al.

[11] Patent Number: 5,946,665
[45] Date of Patent: Aug. 31, 1999

[54] ON LINE SHOPPING SYSTEM USING A COMMUNICATION SYSTEM

[75] Inventors: Tetsujiro Suzuki, Kawasaki; Satoshi Fujii, Tokyo, both of Japan

[73] Assignee: Fujitsu Limited, Kawasaki, Japan

[21] Appl. No.: 08/680,964

[22] Filed: Jul. 16, 1996

[30] Foreign Application Priority Data

Feb. 26, 1996 [JP] Japan .................................... 8-038124

[51] Int. Cl.⁶ .................................................. G06F 17/60
[52] U.S. Cl. .............................. 705/26; 705/14; 345/355; 345/351
[58] Field of Search ..................... 705/1, 14, 26, 705/5, 27; 395/187.1, 26, 200.33; 345/131, 351, 355, 435

[56] References Cited

U.S. PATENT DOCUMENTS

| | | | |
|---|---|---|---|
| 5,249,293 | 9/1993 | Schreiber et al. | 395/200.33 |
| 5,351,186 | 9/1994 | Bullock et al. | 705/1 |
| 5,453,761 | 9/1995 | Tanaka | 345/179 |
| 5,664,110 | 9/1997 | Green et al. | 705/26 |
| 5,671,354 | 9/1997 | Ito et al. | 395/187.1 |
| 5,708,775 | 1/1998 | Nakamura | 395/185.01 |
| 5,710,887 | 1/1998 | Chelliah et al. | 395/26 |
| 5,729,594 | 3/1998 | Klingman | 379/93.12 |
| 5,808,614 | 9/1998 | Nagahara et al. | 345/355 |

OTHER PUBLICATIONS

Oracle Websystem Delivers Oracle7 Database Power to Create Dynamic, Multimedia Web Applications; PR Newswire; Dialogue: file 88, Acct# 00543641.Oracle Websystem Delivers Oracle7 Database Power to Create Dynamic, Multimedia Web Applications; PR Newswire, Oct. 1995.

Vance; The Web: open for business, Cahners Publishing Associates LP; Dialogue: file 88, Acct# 03786673; p. 30(5), Dec. 1995.

Primary Examiner—Allen R. MacDonald
Assistant Examiner—Romain Jeanty
Attorney, Agent, or Firm—Staas & Halsey

[57] ABSTRACT

A search server system in an online shopping system uses a communications network to provide shopping information for a customer. When a customer wishes to refer to or buy goods, the name of the goods is used to automatically search for stores and/or malls which handle the goods. The thus obtained stores and/or malls are then indicated as a list so that the customer may easily recognize them. Further, detailed information of each store and/or mall is indicated, whereby the customer may appropriately select a store and/or mall and enter it. An indication unit in the search server system provides visual indication information to a client terminal. The visual indication information is produced from image information of the stores. The visual indication information may also be combined with respective image information of the goods from the stores.

7 Claims, 10 Drawing Sheets

FIG.3

| STORE NAME | HANDLING GOODS CLASSIFICATION | | SUMMARY | STORE APPEARANCE (IMAGE) | CATEGORY |
|---|---|---|---|---|---|
| | No.1 | No.2 | | | |
| STORE 'A' | SHOES | BAGS | WHOLE LEATHER GOODS | | 1 (GENERAL STORE) |
| STORE 'B' | SHOES | FOODS | DEPARTMENT STORE | | 2 (STORE INSIDE MALL) |

| ADDRESS | OTHER INFORMATION (SUMMARY) | | | |
|---|---|---|---|---|
| | ADVERTISEMENT | NEW GOODS | BARGAIN SALE | |
| //XXX.XXX | BIG SALE IN FEBRUARY! | FAMOUS DESIGNERS' BRAND NEW PRODUCT ARRIVED! | BOOTS 15% REDUCTION! | |
| //AAA.AAA | BIG SALE THROUGHOUT STORE IN FEBRUARY! | NEW SPRING PRODUCT HAVE ARRIVED! | ALL GOODS 15% REDUCTION! | |

FIG.4

STORE 'B'

| FIRST GOODS CLASSIFICATION | SECOND GOODS CLASSIFICATION | | | ADVERTISEMENT DETAILS | NEW GOODS |
|---|---|---|---|---|---|
| | No.1 | No.2 | No.3 | | |
| SHOES | PUMPS | BOOTS | LEATHER SHOES | LOAFER 15% REDUCTION! | IMPORTED SANDALS ARRIVED |
| FOODS | PERISH-ABLES | DRY FOODS | CANNED FOODS | FRESH FISHES PRESENTED TO THE FIRST 50 ARRIVALS | FRESH CABBAGES ARRIVED |

FIG.5

| CUSTOMER NAME | DATE / TIME | SEARCH MANNER | | LEVEL INFORMATION | | | |
|---|---|---|---|---|---|---|---|
| | | 1 | 2 | ENTERED STORE | SEARCHED GOODS | ADVERTISEMENT | PURCHASE |
| MR.A | 1996.2.20 13:45 | SHOES | PUMPS | STORE 'B' | PUMPS | LADIES' SHOES | PUMPS 'X' PURCHASED |

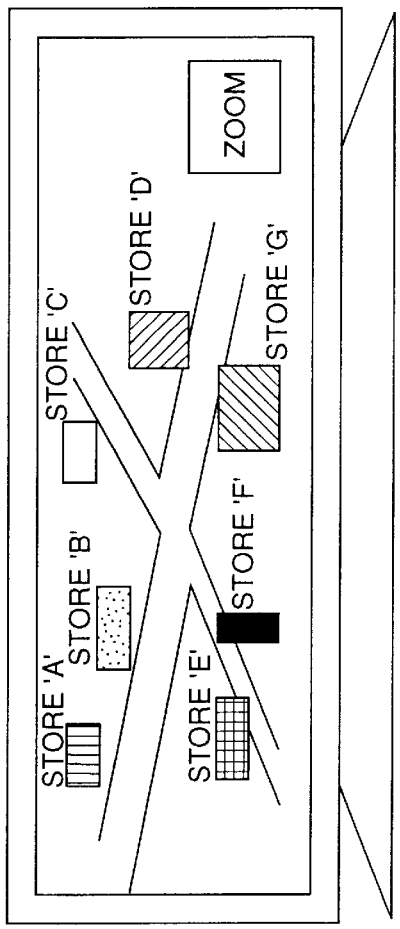
FIG.8
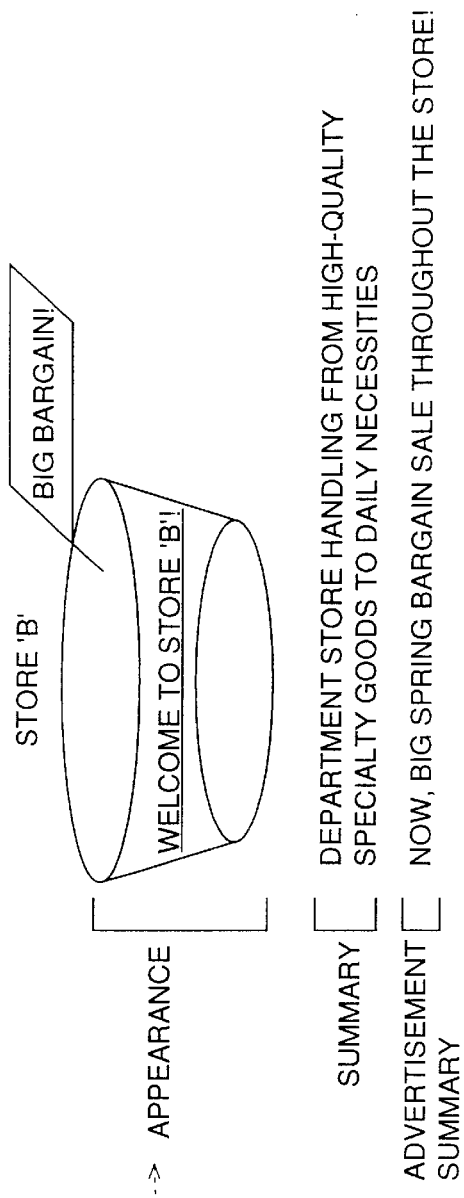
FIG.9B
FIG.9A

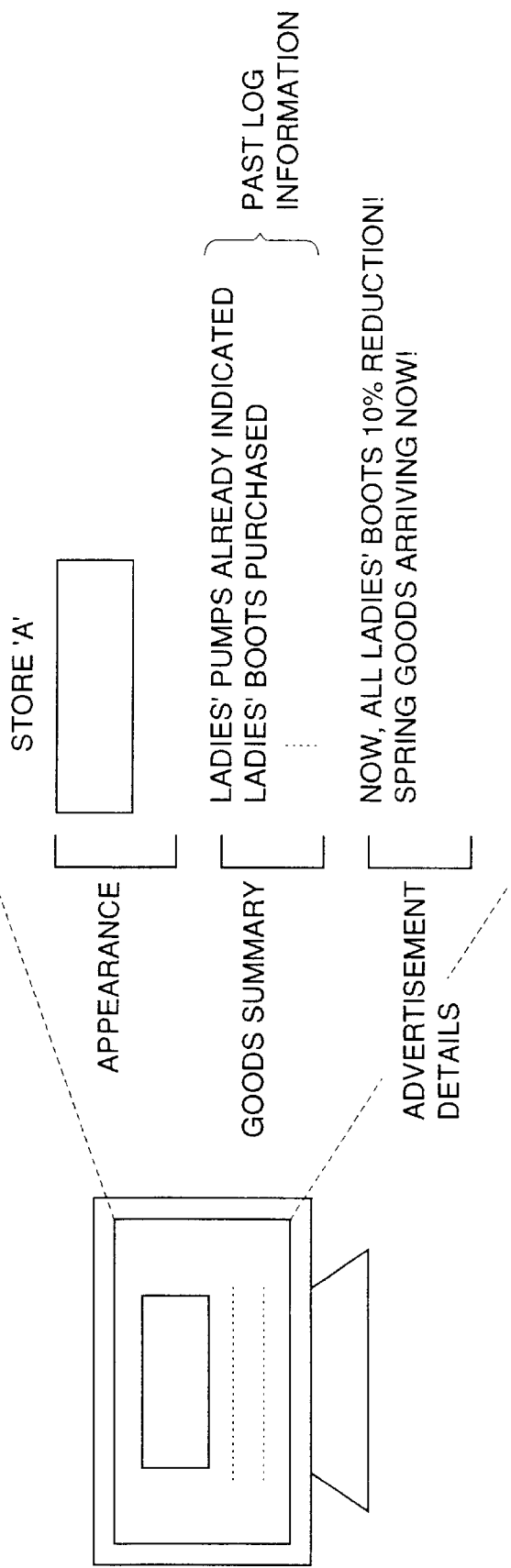

FIG.11

```
<HEAD>
<TITLE>VISUAL TOWN</TITLE>
</HEAD>
<BODY>
<TABLE BORDER=0 CELLPADDING=0 CELLSPACING=0>
<TR>
<TD><A HREF="http://www.aaa.or.jp/aaa/a_shop.htm"><IMG SRC="shop_a.gif" border=0></A></TD>
<TD><A HREF="http://www.bbb.or.jp/bbb/b_shop.htm"><IMG SRC="shop_b.gif" border=0></A></TD>
<TD><A HREF="http://www.ccc.or.jp/ccc/c_shop.htm"><IMG SRC="shop_c.gif" border=0></A></TD>
<TD><A HREF="http://www.ddd.or.jp/ddd/d_shop.htm"><IMG SRC="shop_d.gif" border=0></A></TD>
</TR>
<TR>
<TD><IMG SRC="road.gif" border=0></TD>
<TD><IMG SRC="road.gif" border=0></TD>
<TD><IMG SRC="road.gif" border=0></TD>
<TD><IMG SRC="road.gif" border=0></TD>
</TR>
<TR>
<TD><A HREF="http://www.eee.or.jp/eee/e_shop.htm"><IMG SRC="shop_e.gif" border=0></A></TD>
<TD><A HREF="http://www.fff.or.jp/fff/f_shop.htm"><IMG SRC="shop_f.gif" border=0></A></TD>
<TD><A HREF="http://www.ggg.or.jp/ggg/g_shop.htm"><IMG SRC="shop_g.gif" border=0></A></TD>
</TR>
</TABLE>
</BODY>
```

① TITLE "VISUAL TOWN"

② ADDRESS INFORMATION AND STORE IMAGE INFORMATION OF STORES 'A' TO 'D'

③ STREET IMAGE INFORMATION

④ ADDRESS INFORMATION AND STORE IMAGE INFORMATION OF STORES 'E' TO 'G'

ON LINE SHOPPING SYSTEM USING A COMMUNICATION SYSTEM

BACKGROUND OF THE INVENTION

1. Field of the Invention

The present invention relates to a search server system in which stores are searched for and indicated, goods being referred to and bought through the stores. For example, the present invention particularly relates to a search server system used in online shopping using www (World Wide Web) servers in the Internet.

2. Description of the Related Art

In the related art, a customer in the general public operates a client terminal, enters (or accesses) a virtual cyber-mall (a mall in which virtual stores are arranged), refers to stores in the mall from store to store, and buys goods from a store of the mall. In this case, when the customer wishes to enter the mall, the customer may directly input the address of the mall. Instead, the customer may use an address search server, thus search for a partial name of an address of the mall in the server through a letter search method using the letters of the partial name, obtain the address of the mall, and use the obtained address of the mall to enter the mall.

Thus, in the related art, an address is input, or a partial name is searched for and a thus-obtained address is used to access a desired mall. In such a system, if a customer does not previously know the address or the name of a desired mall, the customer cannot enter the mall.

SUMMARY OF THE INVENTION

In order to solve such a problem, a system is demanded wherein, when a customer wishes to refer to or buy some goods, the name of the goods is used for automatically searching for stores and/or malls which handle the goods, the thus-obtained stores and/or malls being then indicated as a list so that the customer may easily recognize them. Further, detailed information of each store and/or each mall is indicated, whereby the customer appropriately selects a store and/or a mall and enters it.

An object of the present invention is to fulfill such a demand, and to provide a system which will now be described. In the system, a customer in the general public operates a client terminal, and thus inputs a search condition, such as a kind of goods which the customer wishes to buy, using a specific server in a communications network. In response thereto, a list of stores, visual information (virtual cyber-malls and so forth) and detailed visual information (virtual cyber-streets and so forth) are obtained and sequentially indicated. Thus, the customer is introduced to the mall/stores. Further, based on past log information for the stores handling the desired goods for the customer, appropriate goods information is indicated, and also log information for the customer is collected. Thereby, in the communications network, the customer may select goods, enter stores handling the goods, refer to goods of the stores from store to store, buy goods, and refer to history information of the customer concerning the store, the history information being used by the customer to appropriately select goods.

A search server system according to the present invention is a system in an online shopping system using a communications network, and the search server system comprises:

search means, in response to purchase search conditions input through a client terminal, for providing to the client terminal information of stores which will provide goods which fulfill the purchase search conditions; and indication means for providing to the client terminal visual indication information produced of image information of the stores which have been obtained by the search means, in which visual indication information respective image information of the stores are combined with each other.

It is preferable that the indication means, in response to magnification indication instructions input through the client terminal, provides to said client terminal information concerning the stores together with the image information of the stores.

It is also preferable that the indication means, in response to selection of a store from the visual indication information being indicated on the client terminal, uses address information of the store and thus connects the client terminal to a server of the store via the communications network.

It is also preferable that the search server system further comprises log level information search means which, in response to store indication instructions, searches a database, thus obtains store information and log level information which was collected in the past for a customer, and transmits the store information and the log level information to the client terminal which indicates the store information and the log level information to the customer.

It is also preferable that the log level information comprises names of stores which the customer entered, names of goods which were indicated on the client terminal and names of goods which the customer purchased.

Other objects and further features of the present invention will become more apparent from the following detailed description when read in conjunction with the accompanying drawings.

BRIEF DESCRIPTION OF THE DRAWINGS

FIG. 3 shows an example of the storage contents of a store index database shown in FIG. 1;

FIG. 4 shows an example of the storage contents of a store database shown in FIG. 1;

FIG. 5 shows an example of the storage contents of a log information file shown in FIG. 1;

FIG. 8 illustrates an example of a virtual cyber-mall screen image indication in the embodiment shown in FIG. 1;

FIGS. 9A and 9B illustrate an example of a virtual cyber-street screen image indication in the embodiment shown in FIG. 1;

FIGS. 10A and 10B illustrate an example of a store information screen image indication in the embodiment shown in FIG. 1;

FIG. 11 shows an example of HTML descriptions for a virtual cyber-mall indication in the embodiment shown in FIG. 1;

DETAILED DESCRIPTION OF THE PREFERRED EMBODIMENT

Figure 1:
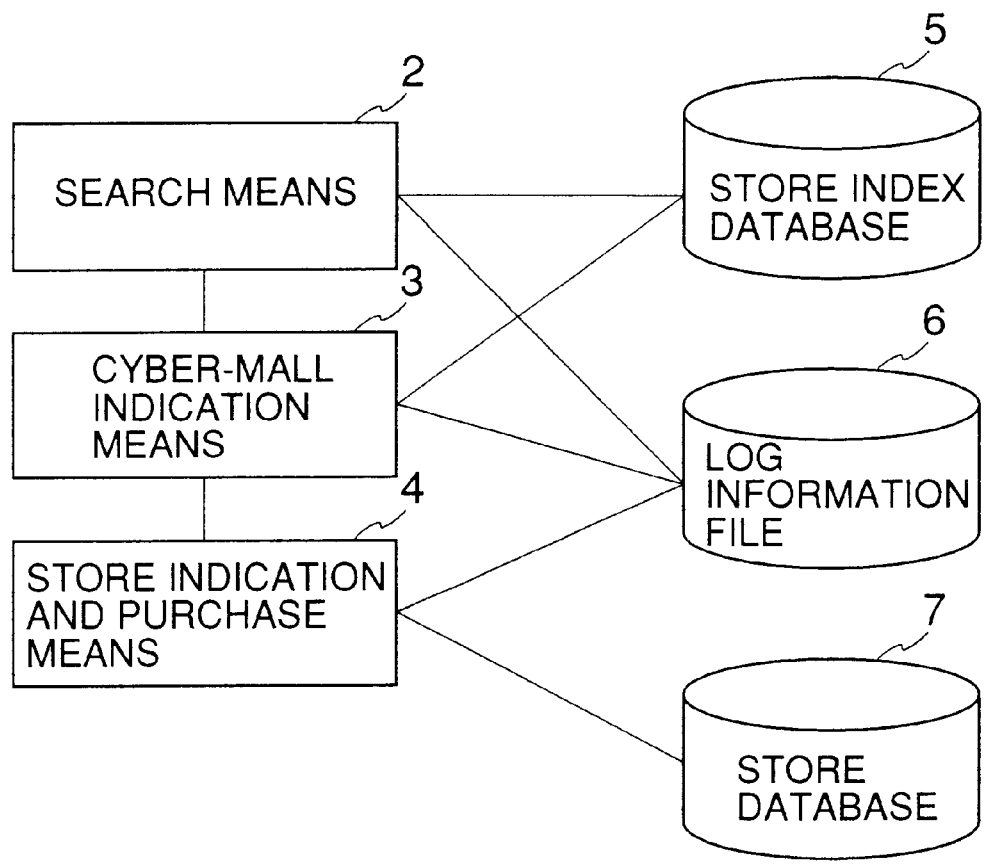
FIG. 1 shows a system arrangement of an embodiment of the present invention.

With reference to FIG. 1, a general arrangement of a server 1 in an embodiment of the present invention will now be described. The server 1 comprises a computer, and is connected with client terminals via a communications network (not shown in the figure). Thereby, the server 1 provide various services for customers via the client terminals. The server 1 includes, as shown in the figure, a search means 2, a cyber-mall indication means 3, a store indication and purchase means 4, a store index database 5, a log information file 6 and a store database 7.

The search means 2, cyber-mall indication means 3 and store indication and purchase means 4 can be practiced using a general-purpose computer that is specially configured by a predetermined software stored in a computer-usable medium. The above-mentioned databases 5, 7 and file 6 can be practiced as individual data files, respectively, stored in one or a plurality of general-purpose storage devices, such as a hard disc drive device(s), a floppy disc drive device(s), a RAM(s) and/or the like. In a case where a plurality of files thereof are stored in a single common storage device, the storage area of the common storage device is allocated for the files individually in a well-known manner.

The search means 2 responds to a customer's request provided via a client terminal, thus searches the store index database 5 for requested information, uses the thus-obtained information to produce information (such as a list of stores and so forth, for example), sends the produced information to the client terminal which then indicates the sent information to the customer.

The cyber-mall indication means 3 responds to a customer's request provided via a client terminal, searches the store index database 5 for requested information (such as visual information (about a virtual cyber-mall and so forth) in which image data of stores is combined and indicated as a mall and detailed visual information (about a virtual cyber-street) of a store which has been selected from the stores of the virtual cyber-mall), sends the thus-obtained information to the client terminal which then indicates the sent information to the customer.

The store indication and purchase means 4 responds to a customer's request provided via a client terminal, thus searches the store database 7 and log information file 6 for requested information (such as store information, past log information of the customer and so forth, for example), sends the information to the client terminal which then indicates the sent information to the customer.

The store index database 5 previously stores information about goods and so forth, in a way such that the information about the goods handled by stores and so forth has connections with names of the stores, respectively. Thereby, customers can easily search the database 5.

The log information file 6 stores logs such as the names of stores which customers accessed, names of goods which customers searched for, names of goods which customers bought, and so forth.

The store database 7 previously stores information about goods handled by stores, detailed advertisements of the stores, introduction of new goods and so forth, in a way such that the stored information has connections with the stores, respectively. Thereby, customers can easily search the database 7.

The search means 2 of the server 1 responds to a customer's search condition provided from a client terminal via the communications network, thus searches the store index database 5 for requested information, uses the thus-obtained information to produce a list of stores according to the customer's request, sends the information of this list to the client terminal which then indicates the sent information to the customer. In response thereto, the customer inputs to the server 1, via the client terminal, a request for a visual indication for the indicated list of stores. The cyber-mall indication means 3 responds to this customer's request provided via the client terminal, searches the store index database 5 for requested visual indication information, sends the thus-obtained information to the client terminal which then performs the visual indication using the sent visual indication information. Then, the customer inputs to the server 1, via the client terminal, a request for a zooming indication. In response thereto, the cyber-mall indication means 3 searches the store index database 5 for detailed visual indication information according to the request, sends the information to the client terminal, which then performs the detailed visual indication using the sent information. Then, the customer inputs to the server 1, via the client terminal, a request for selecting one store from the stores indicated in the list of stores, visual indication and/or detailed visual indication. In response thereto, the server 1 obtains address information which was set for the selected store, uses the address information and thus connects the client terminal with the server of that store via the communications network.

Further, the customer inputs to the server 1, through the client terminal via the communications network a request for a store indication. In response to this request, the store indication and purchase means 4 searches the store database 7 for store information of that store, sends the thus-obtained information to the client terminal which then indicates the sent information. Then, the customer inputs to the server 1 a request for referring to detailed information of one item selected from the items included in that store information which is indicated on the client terminal. The store indication and purchase means 4 responds to this request, searches the store database 7 for the detailed information of the requested item, sends the thus-obtained information to the client terminal which then indicates the sent information to the customer. The customer then inputs to the server 1 a request for referring to goods information of one article of the goods included in that store information and/or detailed information indicated on the client terminal. The store indication and purchase means 4 responds to this request, searches the store data base 7 for goods information of the selected article, sends the thus-obtained information to the client terminal which indicates the sent information to the customer.

At this time, the store indication and purchase means 4 responds to the store indication request which is provided to the server 1 through the client terminal via the communications network by the customer. Thus, the store indication and purchase means 4 searches the store database 7 and log information file 6 for past collected log level information, sends the thus-obtained information to the client terminal which indicates the thus-sent customer's past log level information together with the above-mentioned store information.

Further, the log level information being indicated on the client terminal includes names of stores which that customer entered, names of goods which the customer caused to be indicated, and names of goods which the customer bought.

Thus, a customer in the general public may operate a client terminal, and thus input a search condition, using a specific server 1 in the communications network. In response thereto, a list of desired stores, visual information (virtual cyber-malls) and detailed visual information (virtual cyber-streets) are obtained and sequentially indicated. Thus, the customer is introduced to the mall/stores. Further, based on past log information for the stores handling the desired goods for the customer, appropriate goods information is indicated, and also log information for the customer is collected. Thereby, in the communications network, the customer may select goods, enter stores handling the desired goods, refer to goods of the stores from store to store, buy goods, and refer to history information of the customer, the history information being used by the customer to appropriately select goods to buy.

With reference to FIGS. 2–13, the embodiment of the present invention, shown in FIG. 1, will now be described in detail.

Figure 2:
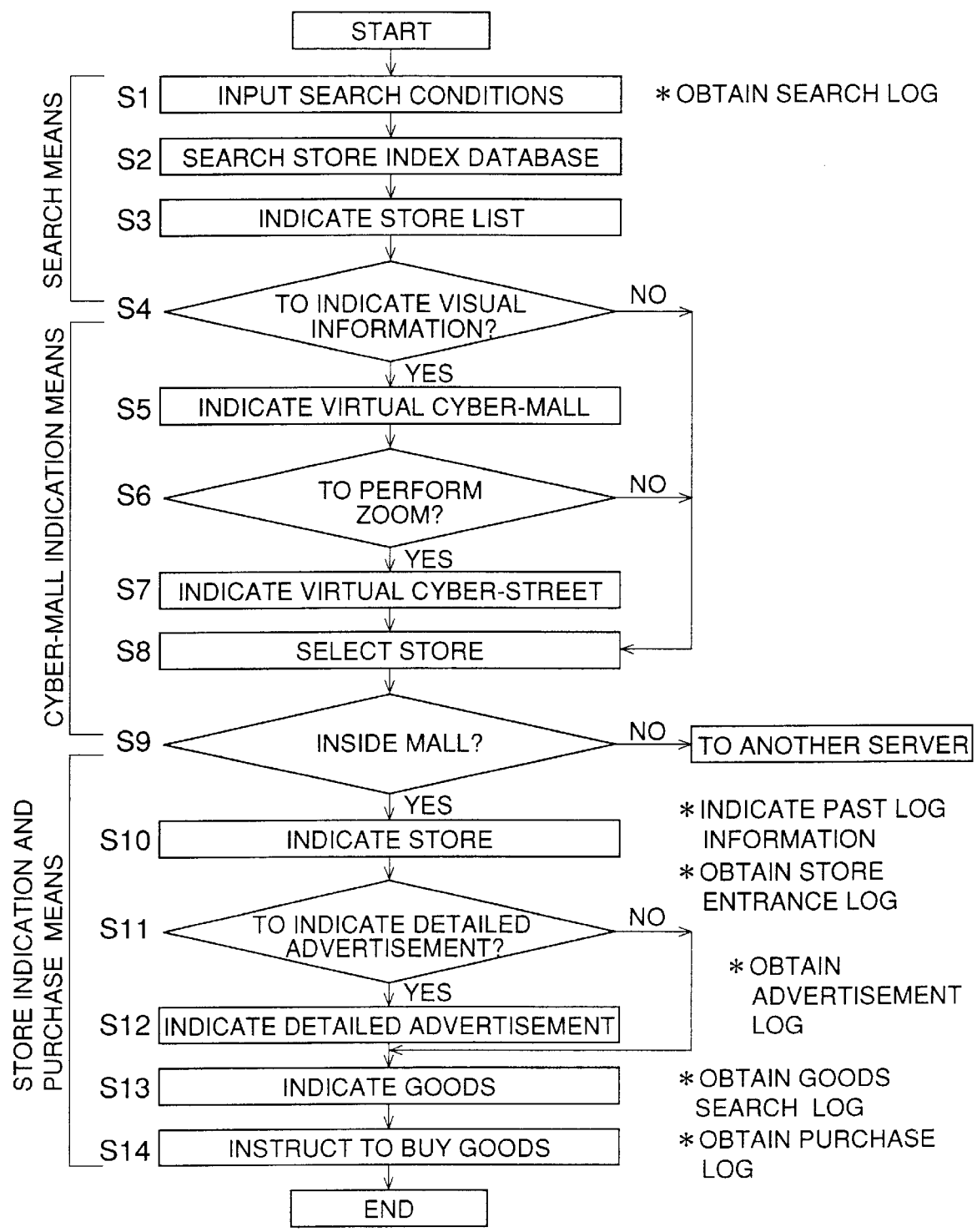
FIG. 2 shows an operation flowchart of the embodiment shown in FIG. 1.

FIG. 2 shows an operation flowchart of the embodiment of the present invention.

Figure 6:
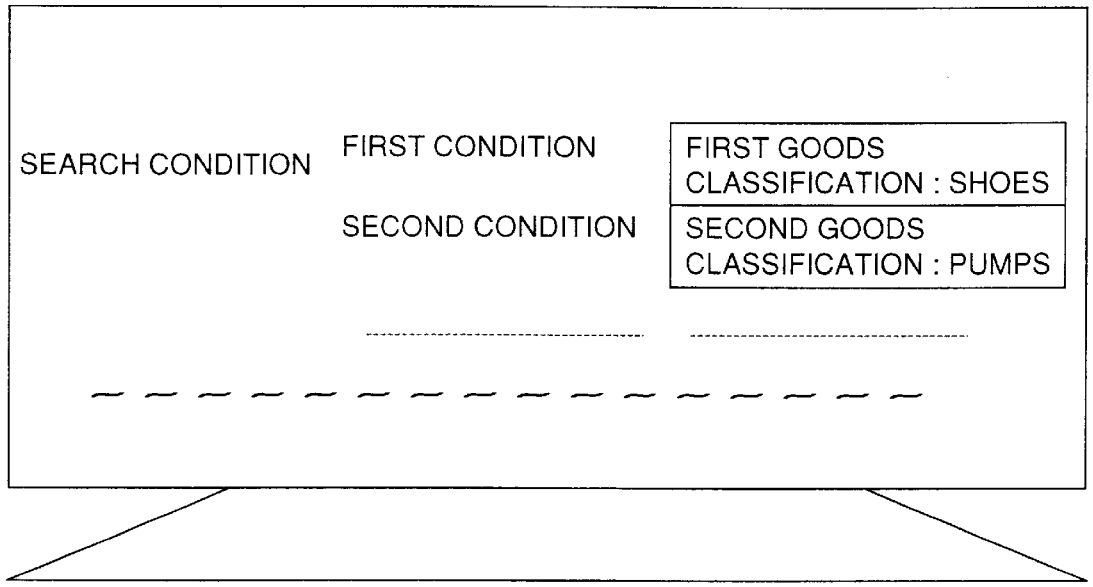
FIG. 6 illustrates an example of a search-condition input screen image indication in the embodiment shown in FIG. 1.

In a step S1 (the term 'step' being omitted, hereinafter), a customer inputs search conditions to the client terminal which is connected to the server 1 via the communications network. Specifically, a screen image such as that shown in FIG. 6 is shown to the customer through the client terminal, and the customer inputs, for example:

'A first condition: a first goods classification: shoes;
a second condition: a second goods classification: pumps';

In S2, the store index database 5 is searched. Specifically, in response to the customer pressing an OK button on the client terminal for the search conditions indicated in the screen image in S1, the input search conditions are automatically transmitted to the server 1 via the communications network. Then, the search means 2 of the server 1 receives the sent search conditions and searches the store index database 5, which stores information such as that shown in FIG. 3, for example. Thus, the search means 2 obtains information of stores from the store index database 5, which stores fulfill those search conditions. Further, the search means 2 obtains, from the store index database 5, log information of those stores.

In S3, a store list is indicated on the client terminal. Specifically, the store list is produced using the information of those stores and log information thereof in the server 1, the produced list is transmitted to the client terminal via the communications network, and the transmitted store list, such as that shown in FIG. 7, for example, is indicated on the client terminal. The indicated store list includes each store which fulfills those search conditions, as well as the name of the store, the summary of the store, the address thereof, past access information thereof (for example, information that, that customer entered the store, bought goods therefrom, and so forth).

Figure 7:
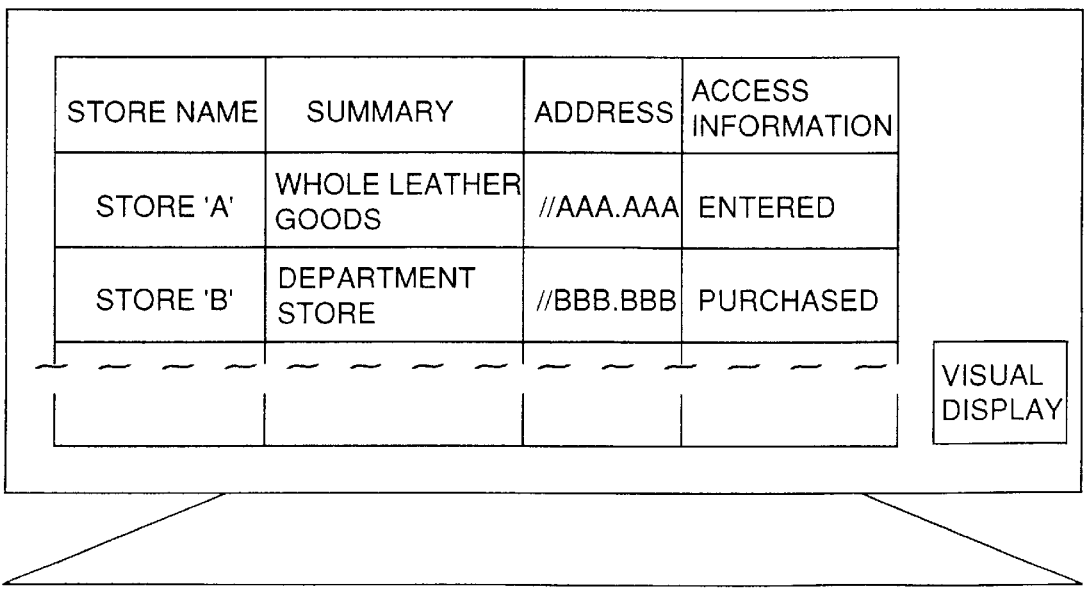
FIG. 7 illustrates an example of a store list screen image indication in the embodiment shown in FIG. 1.

In S4, it is determined whether or not the visual information indication has been selected by the customer. Specifically, it is determined whether or not, for example, a box 'visual display' indicated together with the store list as shown in FIG. 7 in S3 has been selected by the customer through, for example, a clicking operation using a mouse. If it is determined that the visual information indication has been selected, S5 is performed. If not, S8 is performed.

In S5, because the visual information indication has been selected, the virtual cyber-mall indication is performed. Specifically, that selection of the visual information indication in S4 is transmitted to the server 1 via the communications network and the cyber-mall indication means 3 of the server 1 searches the store index database 5. Thus, the visual indication information is obtained as a result of the searching, is transmitted to the client terminal via the communications network, and is indicated on the client terminal. This indication is indication of a virtual cyber-mall, as the visual indication, such as that shown in FIG. 8, for example. This indication of the virtual cyber-mall (that is, the visual indication of the store list) is such as that shown in FIG. 8, in which each store of that store list is arranged in an imaginary mall illustration and the store name is indicated.

In S6, it is determined whether or not the zooming indication has been selected by the customer. Specifically, for example, it is determined whether or not a box 'zoom' indicated in a screen image of the virtual cyber-mall such as that shown in FIG. 8 has been selected by the customer with the mouse clicking operation. If it is determined that the box 'zoom' has been selected by the customer, S7 is performed. If not, S8 is performed.

In S7, because the zooming indication has been selected in S6, the virtual cyber-street indication is performed. Specifically, that selection of the virtual cyber-street indication in S6 is transmitted to the server 1 via the communications network, and the cyber-mall indication means 3 of the server 1 searches the store index database 5. Thus, the detailed visual indication information is obtained as a result of the searching, is transmitted to the client terminal via the communications network, and is indicated on the client terminal. This virtual cyber-street indication is street indication of stores selected by the customer from that store list. As shown in FIGS. 9A and 9B, for example, in the street indication, an imaginary appearance, summary, advertisement summary and so forth are indicated for easy understanding.

In S8, the customer selects a store. Specifically, the customer selects any store indicated in any indication of the store list indicated in S3, virtual cyber-mall indication in S5, and virtual cyber-street indication in S7.

In S9, it is determined whether or not the store selected by the customer in S8 is a store in the mall. Specifically, it is determined whether or not the selected store is a store of the server 1. This determination is performed by determining whether the address information preset for that store indicates an address in the server 1. If it is determined that, that store is a store in the mall, S10 is performed. If not, it is determined that the store is a store of another server. In this case, that address information indicates the address of that other server, and the address information is used for accessing that other server via the communications network. Then, the customer enters the store in the other server according to that address information.

In summary, in S1–S9, the customer operates the client terminal and thus accesses, via the communications network, the server 1, having functions shown in FIG. 1, which provides the services according to the embodiment of the present invention. In response thereto, the server 1 transmits a search screen image such as that shown in FIG. 6 to the client terminal which then displays the search screen image such as that shown in FIG. 7 to the customer. The customer inputs the search conditions according to the input instructions provided by the screen image. The store list including the stores which fulfill the input search conditions is provided by the server 1 and is displayed through the client terminal to the customer. When the customer selects the 'visual display' box indicated in the store list screen image, the virtual cyber-mall is indicated, as shown in FIG. 8, for example, as the visual indication of the store list, through the client terminal to the customer. When the customer selects the 'zoom' box indicated in the virtual cyber-mall indication screen image, the virtual cyber-screen such as that shown in FIGS. 9A and 9B is indicated, for example, as the detailed visual indication. The customer may refer to the store list, virtual cyber-mall and virtual cyber-screen, and find out stores which handle the goods desired by the customer. Then, the customer selects those stores through the client terminal via the communications network. Thus, the address information preset to those stores are used and, thus, those stores of the server having that address information can be accessed.

FIG. 3 shows an example of the storage contents of the store index database 5 in the embodiment of the present invention. Those storage contents are previously stored in the database 5 to be easy to search for and include the following items for each store:

```
            Store Name: a store 'A';
            Handling Goods Classification: No. 1 (shoes),
      No. 2 (bags), . . . ;
            Summary: whole leather goods;
            Store Appearance: (image information of an
      imaginary store appearance);
                Category: 1 (indicating a general store) or
      3 (indicating a store inside the mall, that is, inside
      the mall configured in the server 1 shown in FIG. 1);
                Address: (an address for accessing this
      store);
                Other Information (Summary);
                    Advertisement: 'Big sale in February!';
                    New Goods: 'Famous designers' brand new
      products arrived!';
                    Bargain Sale: 'Boots 15% reduction!'.
```

Those items of information (i.e., the handling goods classification, summary, store appearance, address information, and other miscellaneous summary) are previously stored in the store index database 5 for each store. This storage is performed in a way in which a search can be easily performed using each item. Thereby, as described above for S2 shown in FIG. 2, the search is performed using the search conditions which are input by a customer, for example:

```
            A first condition: a first goods
      classification: 'shoes';
                a second condition: a second goods
      classification: 'pumps';
                and so forth.
```

Thereby, from those input items, the stores handling those goods are searched for, and the list of those stores is easily produced. Further, in response to the customer's selection of the visual indication and/or zooming indication, the storage contents of the database 5 are obtained for those stores and thereby the virtual cyber-mall such as that shown in FIG. 8 and/or the virtual cyber-street such as that shown in FIGS. 9A and 9B can be indicated, as mentioned above.

FIG. 4 shows an example of the storage contents of the store database 7 in the embodiment of the present invention. Those storage contents are previously stored in the database 7 for easy to search for and include, for each store name, the following items of goods handled by the store:

```
            Store Name: store 'B';
                First Goods Classification: shoes;
                Second Goods Classification
                    No. 1: pumps;
                    No. 2: boots;
                    No. 3: leather shoes;
                    . . . ;
                Advertisement Details: 'Loafers 15%
      reduction!';
                    New Goods: 'Imported sandals arrived!';
                    Others: (store appearance image data).
```

Those items of information (i.e., goods (the first goods classification, second goods classification, and so forth), advertisement details, new goods and so forth) are previously stored in the store database 7 for each store. Then, as mentioned for S10 shown in FIG. 2, the store database 7 having those contents stored therein is searched for. Thus, for example, as shown in FIGS. 10A and 10B, information of an imaginary store appearance, goods summary, and advertisement details is searched for from the store database 7 for a selected store, and also past log level information is searched for from the log information file 6 for that store. Thus, the thus-obtained information can be indicated together.

FIG. 5 shows an example of the storage contents of the log information file 6 in the embodiment of the present invention. The storage contents are obtained as a result of collecting, for each level, information when each customer, in the past, connected the client terminal to the server 1 via the communication network through the client terminal. The following items of information are stored for each customer:

```
            Customer Name: Mr. 'A';
            Date/Time: 1996. 2. 20 13:45;
            Search Manner:
                1 (First condition) - shoes;
                2 (Second condition) - pumps;
            Level Information:
                Entered store - the store 'B';
                Searched goods - pumps;
                Indicated advertisement - ladies'
      shoes;
                Purchased goods - pumps 'X';
                Others.
```

Those items of log information (date/time, search ways, level information) are collected and stored for each customer. Then, for example, when a customer enters the store shown in FIGS. 10A and 10B, goods handled by that store, a goods summary, and advertisement details as well as that log information are searched for. The thus-obtained log information (such as information that 'goods were already purchased by that customer') is indicated on the client terminal to that customer. Thereby, the customer may appropriately selects goods which go well with those already purchased. Thus, information helpful for the customer can be provided. Furthermore, such log information can be useful for the stores. Specifically, the stores may use the log information and thus can determine a demand for goods for each customer. Such a use of log information is meaningful for the store to determine strategies and/or sales information, for example.

FIG. 6 shows an example of the search conditions in the embodiment of the present invention. A screen image shown in FIG. 6 is an example of a search-condition input screen image which is indicated on the client terminal in S1 shown in FIG. 2 described above. In this case, the search conditions are input as follows:

```
    The first condition: the first goods
classification - shoes;
        the second condition: the second goods
    classification - pumps;
        . . .
```

This search-condition input screen image is a screen image which is automatically transmitted from the server 1 and indicated on the client terminal when a customer connects the client terminal to the server 1 via the communications network. The HTML (Hyper Text Markup Language) is ordinarily used for producing this search-condition input screen image.

Thus, when a customer operates the client terminal and thus connects the client terminal to the server 1 via the communications network, the search-condition input screen image shown in FIG. 6 is automatically transmitted from the server 1 to the client terminal which then displays the screen image. Then, merely by the customer's inputting of goods search conditions using the displayed screen image, the input search conditions can be automatically transmitted to the server 1 from the client terminal.

FIG. 7 shows an example of the store list in the embodiment of the present invention. This store list is an example of the store list in S3 shown in FIG. 2 described above. This store list is produced as a result of the store index database 5, which has the storage contents such as those shown in FIG. 3, being searched for, in response to the search conditions being input using the screen image shown in FIG. 6. The access information indicated in FIG. 7 is information which is indicated in a screen image as shown in FIG. 7 as a result of the log information file 6 being searched for. The access information includes information when the customer, in the past, accessed those stores. Specifically, as indicated in FIG. 7, the access information includes information that, in the past accessing occasions, the customer entered the store, i.e., the store 'A', and the customer purchased goods in the store, i.e., the store 'B'.

FIG. 8 shows an example of the virtual cyber-mall in the embodiment of the present invention. This virtual cyber-mall is the virtual cyber-mall indicated in S5 shown in FIG. 2 described above. In response to the 'visual display' box, which is indicated in the screen image shown in FIG. 7, being selected through the mouse clicking operation, those stores included in that store list are arranged in an imaginary mall illustration in the screen image as shown in FIG. 8.

FIGS. 9A and 9B show an example of the virtual cyber-street in the embodiment of the present invention. This virtual cyber-street is indicated in S7 shown in FIG. 2 described above. This virtual cyber-street is indicated on the client terminal as shown in FIGS. 9A and 9B in response to the 'zoom' box, which is indicated in a screen image of the cyber-mall indication shown in FIG. 8, being selected by the customer through the mouse clicking operation. FIG. 9A shows the entirety of a screen image of the cyber-screen indication, and FIG. 9B shows a part of the screen image, which part indicates information for the store, i.e., the store 'B'. As shown in FIG. 9B, for the store 'B', the following information is indicated:

```
        Store Name: store 'B';
            Appearance: (an imaginary appearance
    image of the store 'B' and an invitation statement
    'Big bargain! Welcome to the store 'B' ');
```

```
            Summary: 'Department store handling
    from high-quality specialty goods to daily
    necessities';
                Advertisement Summary: 'Now, big spring
    bargain sale throughout the store!'.
```

Thus, the information with regard to the virtual cyber-street which fulfills those search conditions are indicated on the client terminal. Thus, the customer can easily locate stores which handle desired goods using the indicated information.

FIGS. 10A and 10B show an example of store information in the embodiment of the present invention. FIG. 10A shows the entirety of a screen image of the store information, and FIG. 10B shows specific descriptions given in the screen image. In the screen image, for each store name, an imaginary appearance, goods summary and advertisement details are indicated. As shown in FIG. 10B, the descriptions include:

```
        Store Name: store 'A';
            Appearance: (an imaginary appearance
    image of the store 'A');
                Goods Summary: ladies' pumps; and
                    ladies' boots;
                Advertisement Details: 'Now, all
    ladies' boots 10% reduction! Spring goods arriving
    now!';
                Past Log Information: already
    indicated; already purchased.
```

Figure 12:
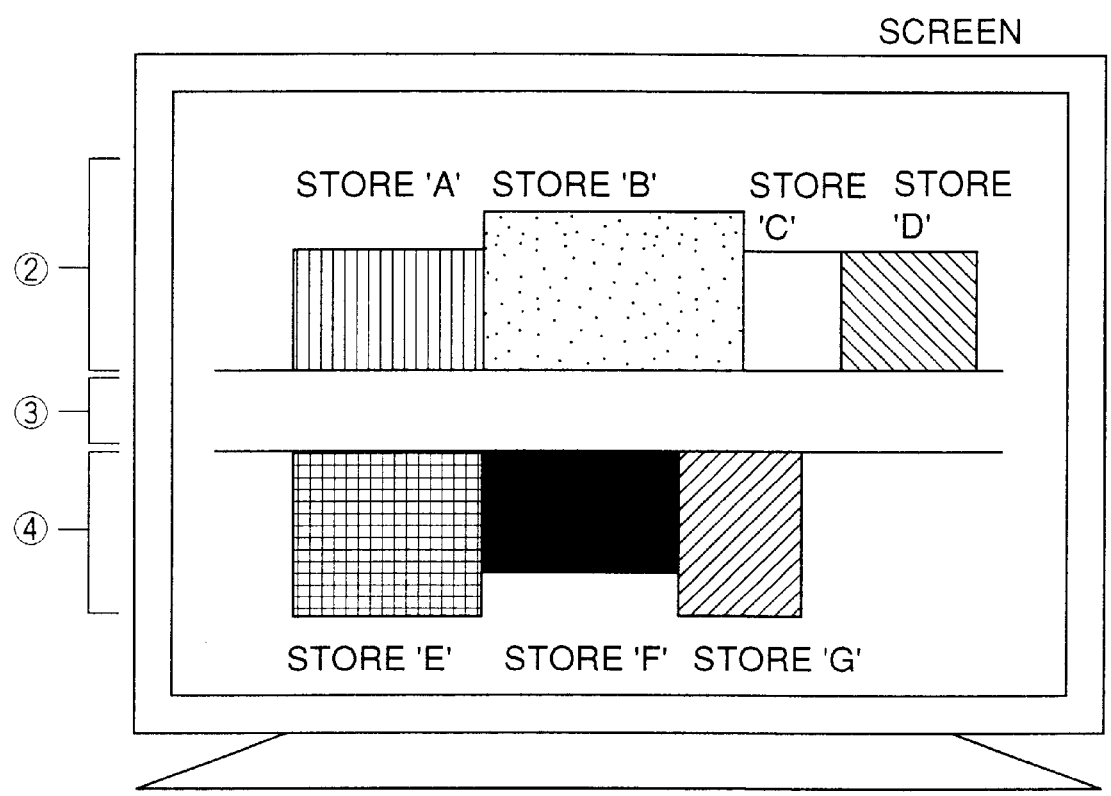
FIG. 12 illustrates another example of a virtual cyber-mall indication, according to the descriptions shown in FIG. 11, in the embodiment shown in FIG. 1.
Figure 13:
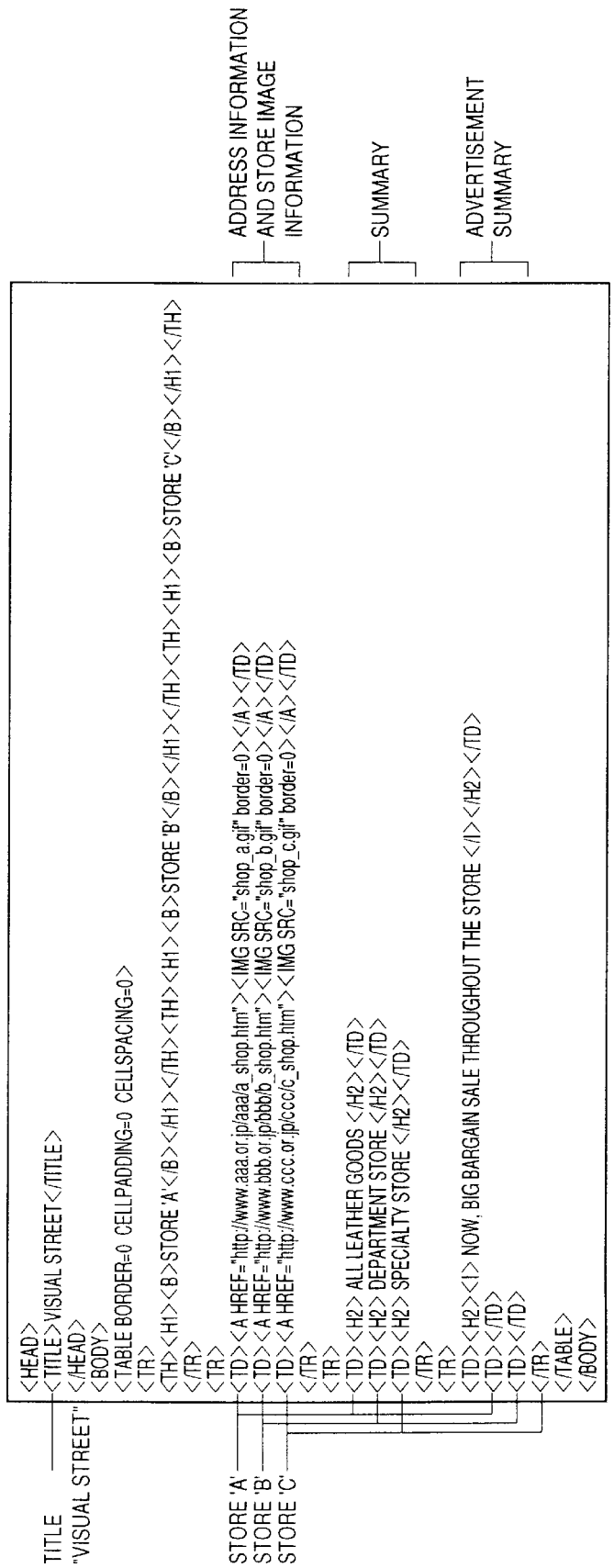
FIG. 13 shows an example of the HTML descriptions for a virtual cyber-street indication in the embodiment shown in FIG. 1.

With reference to FIGS. 11–13, examples of indications of the virtual cyber-mall and virtual cyber-street, using the HTML, will be described.

FIG. 11 shows an example of the HTML descriptions for indicating the virtual cyber-mall. Those descriptions are used, thus, image information of a group of stores which fulfill the search conditions input through the client terminal is combined, and the combined image information is displayed. In those descriptions, as shown in FIG. 11, the following information is described:

```
        Title: 'visual town';
            Address information and store image
    information of stores 'A' to 'D';
                Imaginary street (road) image information;
                Address information and store image
    information of stores 'E' to 'G'.
```

FIG. 12 shows an example of the HTML descriptions for the virtual cyber-mall indication. Those descriptions shown in FIG.11 which were described with the HTML and produced by the server 1 are transmitted to the client terminal via the communications network. Then, the client terminal displays a screen image which indicates a picture of each store and a picture of a street (road), as shown in FIG. 12, using the transmitted HTML descriptions. In this case, the indication is made, wherein, as shown in FIG. 12, those stores (i.e., the stores 'A' to 'G'), which fulfill those search conditions input by the customer for the desired goods, are arranged along the two sides of the road and thus form the virtual cyber-mall (imaginary mall).

FIG. 13 shows an example of the HTML descriptions for the virtual cyber-street indication. Those descriptions are made for indicating the virtual cyber-street such as, but not exactly identical to, that shown in FIGS. 9A and 9B described above. In those descriptions, as shown in FIG. 13, the following information is described:

> Title: 'visual street';
> Stores: store 'A', store 'B', store 'C';
> Address information and store image information;
> Summary;
> Advertisement Summary;
> Others.

The information of the descriptions shown in FIG. 13 is transmitted to the client terminal via the communications network. Thereby, the virtual cyber-street similar to that shown in FIGS. 9A and 9B is displayed on the client terminal.

As described above, the HTML is used for displaying information concerning stores, goods and so forth using text data and still pictures on the client terminal in a manner in which customers can easily understand the contents thereof, in the embodiment. However, it is not necessary to be limited to the HTML, and other languages such as VRML (Virtual Reality Modeling Language), JAVA (Sun Microsystems'hybrid of C and C++ languages) and so forth may be used for displaying information concerning stores, goods and so forth using text data, still pictures, moving pictures, voices, and 3D pictures on the client terminal in a manner in which customers can easily understand the contents thereof.

With reference to FIG. 2, after S10 in which store information such as that shown in FIGS. 10A and 10B is indicated to the customer, S11 is performed. In S11, it is determined whether or not the customer inputs a request for indication of detailed advertisement of the selected store. If it is determined that the detailed advertisement indication request has been input, S12 is performed and thus the detailed advertisement of the store is indicated to the customer through the client terminal. Then, in S13, goods of the store are indicated through the client terminal. Then, in S14, the customer may input which goods the customer purchases, after searching the goods indicated in S13. As a result, through the online shopping system, predetermined goods purchase processing is performed, thus payment for the goods is performed and the goods are sent to the customer.

As shown in FIG. 2, in occasions (levels) of S1, S10, S12, S13 and S14, various log information, i.e., search log, store entrance log, goods search log and goods purchase log are obtained. Such obtained log information may be referred to log level information because the information is obtained in each level of an operation flow such as that shown in FIG. 2. Such obtained information may be used as the above-mentioned history information. For example, as shown in FIG. 10B, as the past log information, information that ladies' pumps were already indicated to the customer, ladies' boots were already purchased by the customer, and so forth, is indicated to the customer. Such information may be useful for the customer to appropriately select goods to be purchased now.

Thus, in the embodiment of the present invention, a customer in the general public may operate a client terminal, and thus input search conditions, using a specific server 1 in the communications network. In response thereto, based on the input search conditions, a store list, visual information (virtual cyber-mall) and detailed visual information (virtual cyber-street) are obtained and sequentially indicated on the client terminal to the customer. Thus, the customer is introduced to the mall and the stores. Further, based on the past log information for the stores handling the desired goods for the customer, appropriate goods information is indicated, and also log information for the customer is collected. Thereby, in the communications network, the customer may specify goods, enter the stores handling the desired goods, refer to goods of the stores from store to store, buy goods, and refer to history information of the customer, the history information being used by the customer to appropriately select goods to buy. Thereby, although a customer cannot access the server of a store without previously knowing the store name of that store in the related art, a customer merely needs to input search conditions such as a name of goods according to the embodiment of the present invention, and thus, a list of stores which handle those goods (such as the store list shown in FIG. 7, for example), store visual information (such as the virtual cyber-mall shown in FIG. 8, for example), and also detailed visual information (such as the virtual cyber-street shown in FIGS. 9A and 9B, for example) are automatically indicated or displayed. The customer refers to those indications and thus may enter the server of a store which handles the desired goods, refer to goods of the store, and purchase goods. Further, the customer can use the past log level information and thus can select goods which go well with those already purchased by the customer.

The present invention is not limited to the above-described embodiments, and variations and modifications may be made without departing from the scope of the present invention.

What is claimed is:

1. A search server system in an online shopping system using a communications network, said search server system comprising:

search means, in response to purchase search conditions input through a client terminal, for providing to said client terminal information of stores which will provide goods which fulfill said purchase search conditions;

indication means for providing to said client terminal visual indication information produced of image information of said stores which have been obtained by said search means, in which visual indication information including respective image information of said stores are combined with each others;

log level storage means for storing log level information which was collected in the past for a customer; and log level information search means which, in response to the purchase search conditions and the log level information, searches a database, obtains store information corresponding to the purchase search conditions and the log level information, and transmits the store information to the client terminal.

2. The search server system according to claim 1, wherein said indication means, in response to magnification indication instructions input through said client terminal, provides to said client terminal information concerning said stores together with said image information of said stores.

3. The search server system according to claim 2, wherein said indication means, in response to selection of a store from said visual indication information being indicated on said client terminal, uses address information of said store and thus connects said client terminal to a server of said store via said communications network.

4. The search server system according to claim 1, wherein said log level information search means transmits said log level information to said client terminal.

5. The search server system according to claim 4, wherein said log level information comprises names of stores which said customer entered, names of goods which were indicated on said client terminal and names of goods which said customer purchased.

6. A computer-implemented search service method, in an online shopping system using a communications network, said search service method comprising the steps of:
   a) searching, in response to purchase search conditions input through a client terminal, for information of stores which will provide goods which fulfill said purchase search conditions;
   b) providing visual indication information produced of pictures of said stores which have been obtained by said step a), in which visual indication information respective pictures of said stores are combined with each other;
   c) storing log level information for a customer in the past; and
   d) obtaining store information corresponding to the purchase search conditions and the stored log level information, and transmitting the store information to the client terminal.

7. A computer program product, comprising:
   a computer usable medium having computer-readable program code means embodied in said medium, said computer-readable program code means comprising:
   first program code means for searching, in response to purchase search conditions input through a client terminal, for information of stores which will provide goods which fulfill said purchase search conditions;
   second program code means for providing visual indication information produced of pictures of said stores which have been obtained by said first program code means, in which visual indication information respective pictures of said stores are combined with each other;
   storage means for storing log level information for a customer in the past; and
   log level information search means which, in response to the purchase search conditions and the log level information, searches a database, obtains store information corresponding to the purchase search conditions and the log level information, and transmits the store information to the client terminal.

\* \* \* \* \*

UNITED STATES PATENT AND TRADEMARK OFFICE
CERTIFICATE OF CORRECTION

PATENT NO. : 5,946,665
DATED : August 31, 1999
INVENTOR(S) : Tetsujiro SUZUKI et al.

It is certified that error appears in the above-identified patent and that said Letters Patent is hereby corrected as shown below:

Col. 12, line 40, change "others" to --other--.

Signed and Sealed this

First Day of February, 2000

Attest:

Q. TODD DICKINSON

*Attesting Officer*  *Acting Commissioner of Patents and Trademarks*